Patented May 19, 1936

2,041,436

UNITED STATES PATENT OFFICE 2,041,436

STABILIZED PREPARATION

Werner Schulemann and Fritz Schönhöfer, Wuppertal-Elberfeld, Germany, assignors to Winthrop Chemical Company, Inc., New York, N. Y., a corporation of New York No Drawing. Application December 21, 1933, Serial No. 703,491. In Germany December 24, 1932

11 Claims. (Cl. 23—250)

This invention relates to stabilized aqueous solutions of heterocyclic nitrogen compounds of basic nature.

It is known in the art that organic substances or their solutions which are sensitive to oxidation may be protected from oxidation by the addition of other substances; for instance, the compounds of the sulfurous acid, such as sodium bisulfite, sodium sulfite, acetone bisulfite and the like have been used for the said purpose. However, the said compounds of the sulfurous acid cannot always be used for the protection of oxidizable organic substances. For instance, aqueous solutions of compounds containing carbon double bindings or compounds which form difficultly soluble salts with the sulfurous or sulfuric acid, which latter is formed by oxidation of the sulfurous acid, should not be mixed with the derivatives of the sulfurous acid for stabilizing purposes.

We have now found that the very oxidizable heterocyclic nitrogen compounds of basic nature, or their aqueous solutions respectively, may be stabilized against oxidation by organic sulfhydryl compounds. The latter compounds have proved generally useful for the stabilization of the said oxidizable heterocyclic nitrogen compounds without showing the disadvantages referred to above. The organic sulfhydryl compounds when exerting their protecting action against oxidation are themselves transformed into the corresponding disulfide compounds which mostly are colorless products, so that the substances or the solutions to be protected against oxidation are not discolored. Generally the sulfhydryl compounds are sufficiently sensitive to oxidation in order to be able to have the protecting effect against oxidation on the most oxidizable organic substances heterocyclic nitrogen compounds of basic nature.

The sulfhydryl compounds useful as stabilizers in accordance with our present invention may contain one or more sulfhydryl groups. The compounds used for the stabilization of aqueous solutions, of course, should be themselves water-soluble. Suitable sulfhydryl compounds are, for instance, thiocarboxylic acids, for instance, thioglycolic acid, thiolactic acid, thioglyoxylic acid, cystein, or sulfhydryl albumoses which are obtainable by cautious hydrolysis and reduction of keratin substances; furthermore, thiophenols, thiophenol carboxylic acids and sulfonic acids. Basic heterocyclic compounds which can be stabilized by the said sulfhydryl compound are, for instance, the products, described in U. S. Patents 1,747,531 and 1,903,196, which refer to aminoalkylamino derivatives of the quinoline series, for instance, the 6-methoxy-8-(alpha-diethylamino - beta - hydroxy - gamma - propylamino) - quinoline, or the products of U. S. Patents 1,766,403, 1,879,540, 1,879,541, which refer, for instance, to basically substituted amino compounds of the acridine, thiazine and diazine series. For the stabilization of such basically substituted aminoquinolines acridines etc. or their aqueous solutions the use of, for instance, thioglycolic acids, thiolactic acids, their water-soluble salts respectively, have proved particularly advantageous. Similarly naturally occurring therapeutically active heterocyclic nitrogen compounds, that is the alkaloid bases, such as quinine, quinidine, morphine, papaverine, hordenine, codein, thebain and ephedrin may be stabilized against oxidation by the addition of a relatively small percentage of organic sulfhydryl compounds. Particularly cleavage products, containing sulfhydryl groups, of keratin substances, such as sulfhydryl albumoses and cystein may be employed as stabilizers. The use of the sulfhydryl compounds above specified has the further advantage that the said thio compounds are readily soluble in water at acid reaction as well as at alkaline or neutral reaction and that these substances themselves frequently exert a remarkable capability of dissolving the substances referred to. The quantity of the stabilizing agent may be in each case relatively low, for instance, below 3% and even below 1%. Stable solutions may be, e. g. prepared in the following manner:

1.79 grams of 8-(alpha-diethylamino-delta-pentyl-amino) - 6 - methoxy-quinoline are dissolved in 8.2 ccs. of normal hydrochloric acid and 20 ccs. of water. 60 grams of quinine hydrochloride and 90 grams of sarcosin anhydride which is used as a medium to increase the solubility of quinine hydrochloride are added and the solution is diluted with water up to a volume of 150 ccs. 0.292 grams of thioglycolic acid and 11.7 ccs. of normal caustic soda solution are then added while stirring and the solution is thereafter filled up to 200 ccs. with water. A weakly yellowish colored solution of weakly alkaline reaction is obtained which does not become discolored on storage in closed vessels, whereas a solution which does not contain a sulfhydryl compound as stabilizer shows a dark brown to blue coloration after a short time when stored under the same conditions.

Stable solutions of the other oxidizable ingredients referred to above may be prepared in an analogous manner which will be fully obvious from the above explanations for those skilled in the art.

We claim:—

1. Aqueous solution of a basic heterocyclic nitrogen compound selected from the group consisting of quinoline, acridine, thiazine and diazine compounds characterized by the content of a slight percentage of a water-soluble organic sulfhydryl compound.

2. Aqueous solution of a basic heterocyclic nitrogen compound selected from the group consisting of quinoline, acridine, thiazine and diazine compounds characterized by the content of a slight percentage of a water-soluble organic sulfhydryl-carboxylic acid compound.

3. Aqueous solution of a basically substituted quinoline derivative characterized by the content of a slight percentage of a water-soluble organic sulfhydryl compound.

4. Aqueous solution of a basically substituted quinoline derivative characterized by the content of a slight percentage of a water-soluble organic sulfhydryl-carboxylic acid compound.

5. Aqueous solution of an alkylaminoalkylamino-quinoline characterized by the content of a slight percentage of a water-soluble organic sulfhydryl compound.

6. Aqueous solution of an alkylaminoalkylamino-quinoline characterized by the content of a slight percentage of a water-soluble organic sulfhydryl-carboxylic acid compound.

7. Aqueous solution of an 8-alkylaminoalkylamino-quinoline characterized by a slight percentage of a water-soluble organic sulfhydryl-carboxylic acid compound.

8. Aqueous solution of an 8-alkylaminoalkylamino-quinoline characterized by a small percentage of a water-soluble salt of thioglycolic acid.

9. Aqueous solution of 6-methoxy-8-(alpha-diethyl-amino-delta-pentylamino)-quinoline characterized by the content of a small percentage of sodium thioglycolate.

10. Aqueous solution comprising 6-methoxy-8-(alpha-diethylamino-delta-pentylamino)-quinoline, quinine-hydrochloride and sarcosin anhydride, which solution is characterized by the content of a small percentage of sodium thioglycolate.

11. Aqueous solution comprising about 1 part by weight of 6-methoxy-8-(alpha-diethylamino-delta-pentylamino)-quinoline, 30 parts by weight of quinine-hydrochloride, 45 parts by weight of sarcosin anhydride, which solution is characterized by the content of about 0.2 parts by weight of sodium thioglycolate.

WERNER SCHULEMANN.
FRITZ SCHÖNHÖFER.